Figure 1:
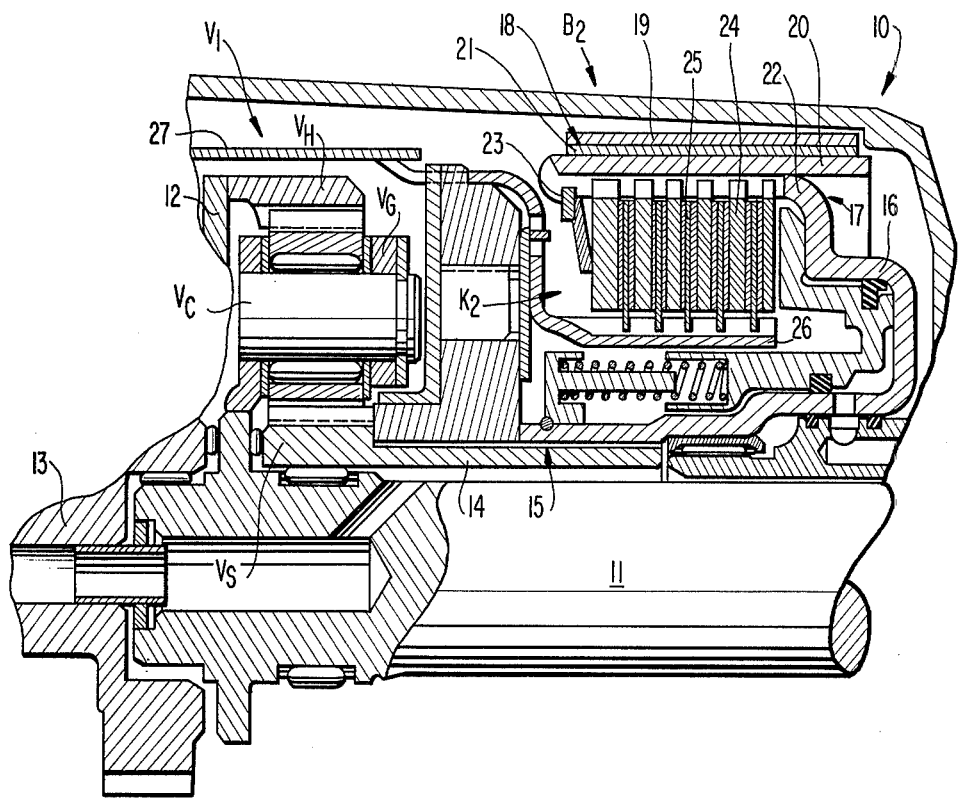

United States Patent [19]

Helmer

[11] 4,098,378
[45] Jul. 4, 1978

[54] BRAKE DRUM FOR ROTATING GEAR CHANGE-SPEED TRANSMISSION

[75] Inventor: Josef Helmer, Aich, Fed. Rep. of Germany

[73] Assignee: Daimler-Benz Aktiengesellschaft, Fed. Rep. of Germany

[21] Appl. No.: 701,550

[22] Filed: Jul. 1, 1976

[30] Foreign Application Priority Data

Jul. 10, 1975 [DE] Fed. Rep. of Germany ....... 2530700

[51] Int. Cl.² .................. V16D 67/04; F16D 13/62
[52] U.S. Cl. .................. 192/17 A; 113/116 A; 188/218 R
[58] Field of Search .............. 188/218 R; 192/17 R, 192/17 A, 85 AA; 74/767; 113/116 A

[56] References Cited
U.S. PATENT DOCUMENTS

| | | | |
|---|---|---|---|
| 1,559,583 | 11/1925 | Nelson | 188/218 R X |
| 1,662,585 | 3/1928 | Murray | 188/218 R X |
| 2,486,815 | 11/1949 | Banker | 192/17 R X |
| 3,190,421 | 6/1965 | Schulz | 192/85 AA |

Primary Examiner—Benjamin W. Wyche
Attorney, Agent, or Firm—Craig & Antonelli

[57] ABSTRACT

A brake drum for braking a transmission member of a planetary gear change-speed transmission, with a cylinder provided on its outside with a cylindrical brake surface for the engagement of a brake band to engage a speed and on its inside with engaging surfaces for the non-rotatable mounting of clutch lamellae of a clutch operating on the transmission member, and with a drive flange which is coaxial and non-rotatable with respect to the cylinder and which is connected for rotation in unison with the transmission member. The cylinder is constructed double-walled by means of a collar provided with the brake surface while the cylinder section disposed on the inside of the collar is constructed in one piece with the drive flange.

7 Claims, 4 Drawing Figures

BRAKE DRUM FOR ROTATING GEAR CHANGE-SPEED TRANSMISSION

The present invention relates to a brake drum for braking a transmission member of a planetary-gear change-speed transmission, with a cylinder provided on its outside with a cylindrical brake surface for the engagement of a brake band of a transmission speed brake and on its inside with engaging surfaces for the non-rotatable mounting of clutch lamellae of a transmission speed clutch operating on the transmission member and with a drive flange concentric as well as non-rotatable with respect to the cylinder which is in non-rotatable, driving connection with the transmission member.

In one known brake drum of this type disclosed, for example, in (German Pat. No. 1,065,684), the drive flange engages in axial grooves of the cylinder by means of claw teeth. The separate construction of the cylinder and of the drive flange is costly and requires relatively heavy, forged blanks for the cylinder and the drive flange.

The task underlying the present invention essentially consists in reducing the structural expenditures of a brake drum of the aforementioned type.

The underlying problems are solved in an advantageous manner according to the present invention in that the cylinder is constructed double-walled by means of a collar provided with the brake surface while the cylinder section disposed on the inside of the collar is constructed in one piece with the drive flange.

In the brake drum according to the present invention, the drive flange and at least the cylinder section disposed on the inside of the collar may form a lightweight, one-piece sheet metal stamping which can be made in a simple manner. The collar may be constructed, for example, as cylindrical sheet metal ring.

The manufacture and structural configuration of the sheet metal drum according to the present invention are simplified in that the cylinder section disposed on the inside of the collar is provided with the engaging surfaces for the mounting support of the clutch lamellae.

In the brake drum according to the present invention, the collar, for example, as a structurally separate sheet metal ring, could be welded together with the inwardly disposed cylinder section for the engaging surfaces for the mounting support of the clutch lamellae.

In an advantageous embodiment of the brake drum according to the present invention, provision is made that the collar is an inverted cylinder section. In this manner, the brake drum forms altogether a single sheet metal stamping or pressed-out part which is adapted to be manufactured in a rational manner by deep-drawing and exhibits the required rigidity and strength.

The engaging surfaces for the mounting support of the clutch lamellae could be formed, for example, by radial pressed-in portions or indentations of the cylinder wall of the cylinder section located inside of the collar.

However, in an advantageous construction of the brake drum according to the present invention, provision is made for the formation of the engaging surfaces that the cylinder section disposed radially inwardly of the collar is provided with at least one window opening.

The manufacture of the brake drum according to the present invention from a one-piece sheet metal disk or rondelle is particularly favorable if the sheet metal disk or rondelle is made by the deep-drawing process into a drum-intermediate shape, in which the collar assumes, with respect to the cylinder section for the axial grooves, a position free of any undercut at an angle non-equal to 180°. The engaging surfaces may also be obtained in the intermediate form itself—preferably by punching or stamping-in of window openings. It may be advantageous for manufacturing reasons to provide the window openings with a spacing with respect to the bending edge of the collar so that a wall web remains between the bending edge and the window opening. These wall webs could be removed in the intermediate form by a simple stamping-out or punching-out operation.

Accordingly, it is an object of the present invention to provide a brake drum for a planetary gear change-speed transmission which avoids by simple means the aforementioned shortcomings and drawbacks encountered in the prior art.

Another object of the present invention resides in a brake drum for a change-speed transmission which obviates the need for relatively heavy forged blanks while at the same time reducing the expenditures for the construction thereof.

A further object of the present invention resides in a brake drum for a planetary gear change-speed transmission which substantially reduces the structural expenditures for the brake drum.

Still another object of the present invention resides in a brake drum of the type described above which can be manufactured by simple, inexpensive means utilizing non-complicated starting parts for the simplified manufacturing process.

Figure 2:
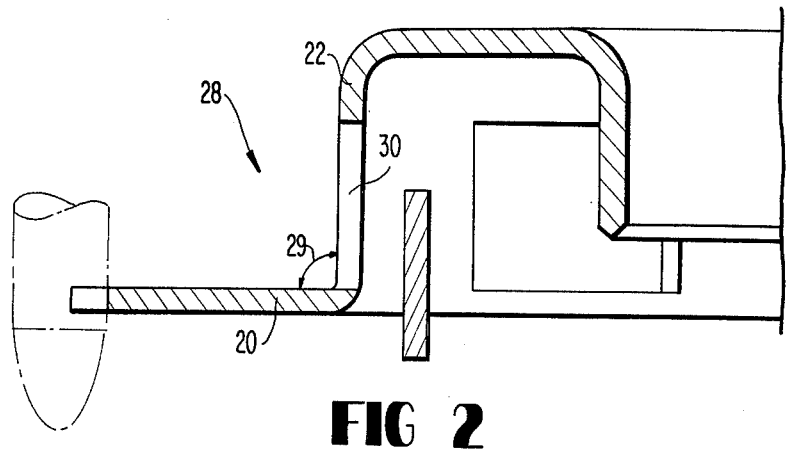
Figure 3:
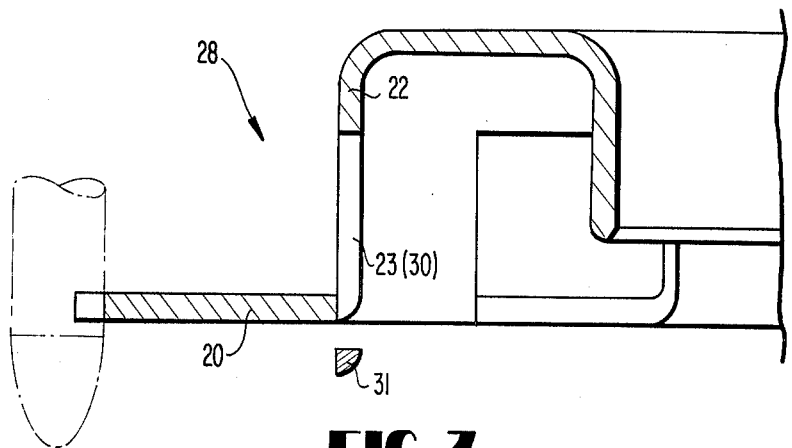
Figure 4:
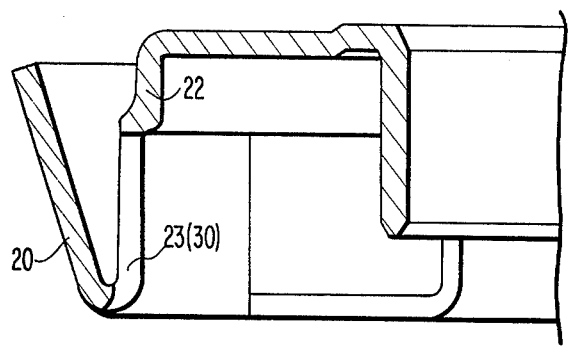

These and other objects, features and advantages of the present invention will become more apparent from the following description when taken in connection with the accompanying drawing which shows, for purposes of illustration only, one embodiment in accordance with the present invention, and wherein:

FIG. 1 is a partial vertical longitudinal cross-sectional view through a planetary gear change-speed transmission with a brake drum according to the present invention; and FIGS. 2 to 4 are schematic views illustrating some of the working steps in the manufacture of the brake drum according to the present invention.

Referring now to the drawing wherein like reference numerals are used throughout the various views to designate like parts, the planetary gear change-speed transmission of FIG. 1, generally designated therein by reference numeral 10, includes a planetary gear generally designated by the reference character $V_1$ whose planetary gear carrier $V_C$ is non-rotatably connected with an output shaft 11 for rotation in unison therewith. The output shaft 11 is adapted to be coupled in the usual manner with the vehicle wheels of a vehicle. The hollow or ring gear $V_H$ of the planetary gear $V_1$ is adapted to be driven from an input shaft 13 by means of a drive connection 12 either directly or under interconnection of a further planetary gear (not shown). The input shaft 13 is adapted to be coupled in the usual manner with a driving engine. The sun gear $V_S$ of the planetary gear $V_1$ is made in one piece with a coupling sleeve 14 which is non-rotatably connected by means of claw or spline teeth generally designated by the reference character 15 with a drive flange 16 for rotation in unison therewith.

The drive flange 16 is in one piece with the cylinder generally designated by reference numeral 17 of a brake drum generally designated by reference numeral 18 of a transmission speed brake generally designated by the reference character $B_2$ which cooperates with a brake band 19 for braking the sun gear $V_S$, i.e., for holding the sun gear $V_S$ stationary upon engagement of the brake. For purposes of the double-walled construction of the cylinder 17, the latter is provided with an outwardly turned over collar 20 which is provided externally thereof with a cylindrical brake surface 21 for the engagement of the brake band 19.

The cylinder section 22 disposed on the inside of the collar 20 is provided on its inside with axial grooves 23 for the non-rotatable mounting support of outer clutch lamellae 24 of a transmission speed clutch generally designated by the reference character $K_2$ operating on the sun gear $V_S$. The outer clutch lamellae 24 cooperate with inner clutch lamellae 25 which are non-rotatably held on a lamellae carrier 26. The lamellae carrier 26 is coupled by means of a drive connection 27 extending over the hollow gear $V_H$ with a transmission member of the other, non-illustrated planetary gear. The transmission speed clutch $K_2$ serves for the engagement of the direct transmission of the planetary gear $V_1$ and is engaged only, when the drive connections 12 and 27 are non-rotatably coupled with the input shaft 13.

The brake drum 18 and its drive flange 16 are made from a sheet metal disk or rondelle in the deep-drawing process. As a result thereof, a considerable saving in weight as well as reduction in the cost of manufacture is achieved as compared to known brake drums, in which the drum and the drive flange are structurally separate, heavy forged parts, which have to be additionally connected with each other by means of an additional form-locking clutch.

As can be seen from FIGS. 2 and 3, the sheet metal disk or rondelle is deep-drawn into an intermediate shape generally designated by reference numeral 28, in which the latter collar 20 forms an angle 29 of 90° with respect to the cylinder section 22 disposed in the end condition on the inside of the collar. In this position of the collar 20 which is free of any undercut, window openings 30 are stamped or punched into the cylinder section 22. Corresponding to FIG. 3, the remaining wall webs 31 between the window openings 30 and the collar 20 are removed by a stamping operation for the conversion of the window openings 30 into one-sided or unilaterally open axial grooves 23. Finally, the inverting of the collar 20 into its end position is indicated in FIG. 4 in which it is supported at the cylinder section 22 (FIG. 1).

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A brake drum for braking a transmission member of a planetary gear change-speed transmission, the brake drum comprising a cylinder, a substantially cylindrical brake surface provided on an outside portion of the cylinder, a transmission brake including a brake band engageable with the brake surface, engaging surface means provided on an inside portion of the cylinder for a non-rotatable mounting support of clutch lamellae of a transmission clutch, the transmission clutch operating on a transmission member of the transmission, and a drive flange arranged substantially coaxial with the cylinder and non-rotatable with respect thereto, the drive flange is operatively connected with the transmission member, characterized in that a collar is provided on the cylinder, the collar is outwardly turned over the cylinder so as to provide for a double-walled construction, the brake surface is provided on an external surface of the collar, and in that a cylinder section is disposed inside of the collar and is made in one piece with the drive flange.

2. A brake drum according to claim 1, characterized in that the engaging surface means is provided on the cylinder section disposed inside of the collar means.

3. A brake drum according to claim 2, characterized in that the engaging surface means include axial grooves.

4. A brake drum according to claim 2, characterized in that the collar is fashioned as an inverted cylinder section.

5. A brake drum according to claim 4, characterized in that at least one window opening is provided in the cylinder section disposed radially inside of the collar.

6. A brake drum according to claim 1, characterized in that the collar is fashioned as an inverted cylinder section.

7. A brake drum according to claim 1, characterized in that at least one window opening is provided in the cylinder section disposed radially inside of the collar.

* * * * *